(No Model.)

L. R. BONEHILL.
SMELTING AND SEPARATING FURNACE.

No. 515,727. Patented Feb. 27, 1894.

WITNESSES
Edward L. Currell
Louis A. Allard

INVENTOR
Louis R. Bonehill

UNITED STATES PATENT OFFICE.

LOUIS ROBERT BONEHILL, OF ST. LOUIS, MISSOURI, ASSIGNOR, BY DIRECT AND MESNE ASSIGNMENTS, OF TWO-THIRDS TO GUSTAVE ALEXANDER PIERROT AND WILLIAM H. SWIFT, OF SAME PLACE.

SMELTING AND SEPARATING FURNACE.

SPECIFICATION forming part of Letters Patent No. 515,727, dated February 27, 1894.

Application filed July 13, 1891. Serial No. 399,428. (No model.)

*To all whom it may concern:*

Be it known that I, LOUIS ROBERT BONEHILL, a native of France, but having duly made oath of my intention to become a citizen of the United States, residing at St. Louis, in the State of Missouri, have invented certain new and useful Improvements in Smelting and Separating Furnaces; and I do hereby declare that the following is a full, clear, and exact description of the invention, which will enable others skilled in the art to which it appertains to make and use the same.

Heretofore, vast bodies of low grade or refractory ores have been deemed unprofitable to treat, on account of the cost of production as compared to the yield; while it is also a fact that the higher grades of ore are being treated at an undeniably large amount or percentage of waste.

My object is to make the treatment of such ores profitable and I have devised the improved smelter as hereinafter described. This smelter consists of a main chamber for the introduction and smelting of the ore, which chamber is connected by flues and tapholes to the conduit leading from a reverberatory furnace to the chimney; purifying receptacles being provided in the conduit for the treatment of the metal. The metal as it leaves the smelting chamber or distributer, passes along the conduit and is treated, according to its nature, until it reaches the last receptacle or purifier in the conduit, where it is finally drawn off.

Figure 1:
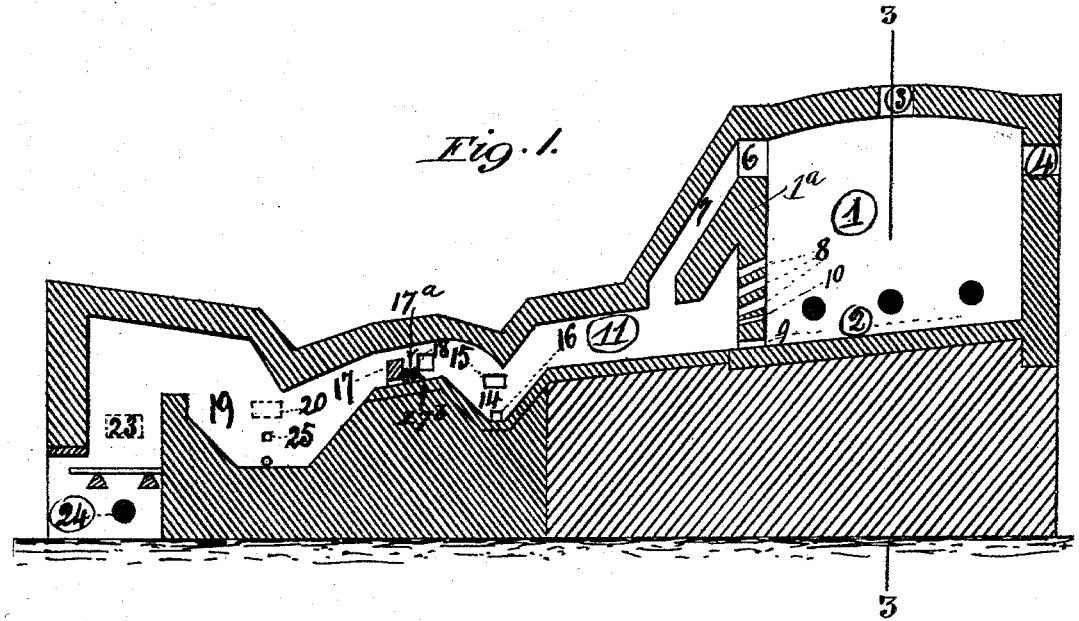
Figure 2:
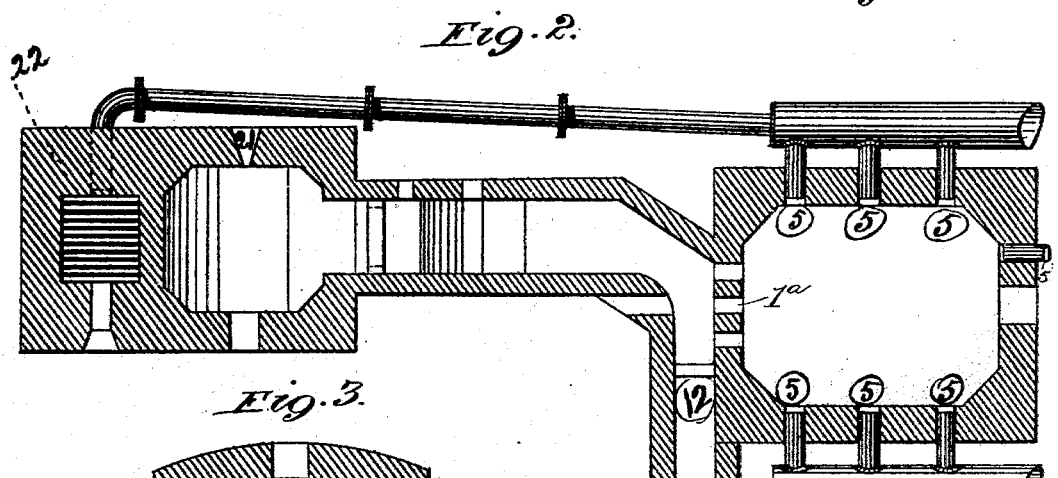
Figure 3:
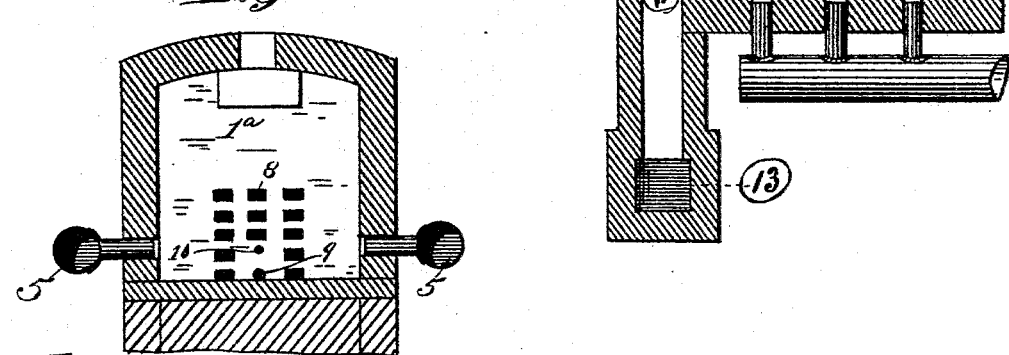

In the drawings: Figure 1 is a vertical longitudinal section through the furnace conduit and distributer. Fig. 2 is a horizontal section showing the bottom in plan, and Fig. 3 is a transverse section through the distributer.

1 is the new distributer chamber, which, by its peculiar and entirely original shape, does away with the need of either concentrating or roasting the ores. The distributer chamber or smelter 1 has a forwardly inclined floor 2, the charging opening 3, and the regulating opening 4 through which the operator is enabled to view the contents of the distributer and even up the alternate layers of fuel and ore. The tuyeres 5 enter the side walls of the distributer near the bottom and supply air under pressure to the charge. These tuyeres are provided with suitable regulating dampers. At the top of the wall $1^a$ is an opening 6 which leads to the flue 7 communicating to the conduit 11 for the passage of gases which escape from the distributer. Below the opening 6 in the wall $1^a$ are the inclined escape openings 8—8, which communicate with the conduit 11 for the escape of the gases from the charge when the opening 6 is closed. When these inclined flues or openings 8 are used, the escaping noxious gases are able to carry along that large proportion of volatile particles which are evolved from the finer metals, in the shape of calcined scales at a certain well-known degree of heat, and which usually escape with the gases and are lost.

Close to the bottom of the flue wall $1^a$ is the opening 9 which forms a passage way for the molten mass when in the matte stage. It is here that the refractory elements are made to pass out by themselves in a thin flattened, pasty sluggish stream which loses hold of the more swiftly running, liquid metal and slag. Just above this opening is the passage way 10, for the molten slag to overflow.

The conduit 11 extends from the distributer 1 to the firebox 22, and acts as the flue of the furnace in connection with its right angle extension 12 that passes by the partition wall $1^a$ to the chimney 13. In the floor of the conduit is formed the depression 14 which I call the receiver, its object being to catch and retain the refractory or silicious elements. In the wall of the receiver is the door 15, and a plug opening 16, through the latter of which, the refractory material is raked off. Just beyond the receiver is a brick partition or bridge 17 which has an arched opening at the floor. In front of the opening I place a supply of some filtering material, $17^a$, preferably coke, which is introduced and handled through the door 18.

19 is the purifier or reverberatory chamber which is provided with the door 20, an opening 21 to tap the metal, and a slag outlet 25. Just beyond the purifier is the fire box 22 with its grate, above which is the door 23 for the fuel and underneath which are the tuyeres 24 connected to the pipe leading to the tuyeres 5, 5.

To operate my distributer furnace, the distributer 1 is preferably charged from the top through the opening 3, which is afterward closed with a fire-clay stopper. Above the distributer is a platform on a level with, and surrounding the top part of the furnace; and upon this platform are placed the supplies of ore and fuel. "To charge" the stopper is lifted and held up by well-known means, the requisite amounts of ore and of fuel are shoveled in alternately and as they reach the inside of the distributer, are kept thoroughly mixed and evened up by racking through the opening or plug-hole 4. When the proper quota of fuel and ore is charged, opening 4 is plugged, the hopper is removed, and the stopper lowered in place. A forced blast from a large ventilator acting through the specially-disposed tuyeres 5, 5, generates a powerful current which produces a speedy fusion. Within half an hour the blast is stopped, in order to ascertain, through a loop-hole, whether the charge has moved down and if so, the charge is deemed fused. A little practice will enable the operator to judge when a new charge is to be introduced; bearing in mind that a steady supply must constantly be maintained inside, as high up as the arch, to preserve the latter from being injured by the intense heat generated. The timely renewal of the charge will secure the arch from wearing out prematurely. The distributer may be of any shape—either square, oval, or circular, and it may be charged either from the top or sides. But the square shape, and process of charging from the top, as above described, are preferable. During the generation of noxious gases in the smelter and distributer 1, the opening 6 and conduit 7 at top of the partition 1ª are closed. This partition is perforated at different heights with flat apertures or slots 8 as already described, extending fully up to the intended melting level of material in the smelter and distributer, and slanting downward to the transverse conduit 12 which leads to the chimney-flue 13. As fast as the gases rise from the distributer, they are met by the powerful pressure of a hot current (coming from the purifier) which rushes through the conduit 11, drawing all gases through the slanting slots to flue 12 and thence to the chimney. This takes the place of the flue usually placed on top of the furnace and which pays directly into the chimney, causing by such direct draft, all particles of metal in the volatile stage to escape through the chimney, thereby entailing an immense loss. By the oblique arrangement of the slots 8 and the maintenance of an intense melting heat to the topmost of them, and the combination therewith of the transverse flue 12 leading to the stack, the escape of any volatile metallic particles in suspension in the gases, is effectually prevented. Every atom of metal in suspension, being projected downward and met by the current of intensely heated products of combustion in the conduit 11 and transverse flue 12 is precipitated, melted and absorbed into liquid mass, which flows through the conduit 11 to the purifier. The transverse flue 12 leading to the stack also serves effectually to carry off and discharge through the stack all noxious gases.

To treat copper and non-refractory ores, the opening 6 and conduit 7 are opened, while the openings 8 are closed. I stop or plug, all of the flat slots 8 and use outlet 9 as a tap for the metal, and outlet 10 for the slag; which latter runs off of itself (when it comes up to the outlet) through conduit 11 into the purifier, carrying along all metallic particles which had not yet assimilated with the matte in the distributer, and liberating them into the purifier, where they form a copper bath which, later on, will unite with the matte. The matte is to be tapped at outlet 9 when deemed nearly pure, and then it runs off in its turn through conduit 11 (kept at a super-heated temperature) finally merging into the purifier with the previous copper bath as described above. Refining is then proceeded with, until the metal is deemed purified enough to allow its running into ingots. Then the whole is gone over again as described.

When treating refractory silica, we must bear in mind that, unlike metal and slag, the refractory silica will not liquefy; also that in other furnaces it remains unyielding, and the metal cannot be extracted thoroughly. By providing a slotted partition I am enabled to disengage effectually both metal and slag from silicious gangues, as follows:

Owing to the intense heat maintained in my distributer, I bring the silica to a soft, pasty state. It is then made to flow through the lower opening 9 of the distributer, onto the slanting floor of conduit 11, along which, under the effect of intense heat, it runs in a thin flattened film, being unable, on account of its extreme thinness, to carry a single particle of metal or slag. The particles of metal flow rapidly along in a liquid mass, ahead of the silica, reaching and gradually filling the receiver 14. This receiver is, a pocket, or trap, sunk in the floor of the conduit 11; there being near the bottom of said trap, an outlet or plug-hole. The aforesaid receiver also receives the silica, but later on, as its flow is sluggish and slower on account of its pasty state, it glides into the receiver, clinging to the bottom owing to its own inert nature. This operation, which is clearly observable in practice may be thus explained. The semi-fluid silicious matter clinging to the bottom of the conduit, but being impelled forward by the pressure of the descending mass behind it, displaces the more fluid molten metal which together with the slag is thus caused to flow freely over the margin of the receiver, and pass down the conduit into the purifier. The silica remains in the receiver 14, from which it is tapped, through outlet 16 at bottom, whenever it accumulates up to nearly a level with the conduit. Care must be taken not to drain the silica exhaustively, for fear of tapping the metal or slag. When sufficiently tapped, the bottom outlet is again plugged up, and the operation is repeated as described. After leaving the receiver as described above, the flowing metal and slag reach the filter 17ª further along in the conduit. The bottom edge of the partition which holds the filtering material is built of fire-clay brick and is slightly arched so as to leave, between the bricks and the floor, a slit or very low passage for the liquid metal and slag. In front of the partition or bridge and on the floor of the conduit, I place some suitable filtering material, preferably coke. When this filtering material is very hot, I introduce through the door 18, a fire-clay tile 17ᵇ which I lay over the filtering material, so that the liquid mass, when flowing (under intense heat) will not cause the filtering material to drift along or float about. Now, the hot slag being lighter than the metal, filters through first and ahead of the metal, and the latter closely follows, being almost freed from the slag and reaching the purifier; the refining is promptly perfected, all being accomplished through a single, direct process.

As described, receiver 14 is omitted when treating non-refractory ores. The process is then similar to that for copper, i. e. stopping the nethermost slots 8, and running the slag off through the passage 10. The receiver is closed or leveled up even with the floor of the conduit, which is thus made continuous; and the metal and slag flow on, uninterrupted from the distributer, along and over the floor of the conduit to the purifier.

Having thus described my invention, what I claim as new therein, and desire to secure by Letters Patent, is—

1. The combination of a smelting and distributing chamber having blast tuyeres, a reverberatory purifying chamber having a fire-box in connection therewith, an inclined conduit from the smelting chamber to the purifying hearth and inclined gas ducts from the smelting chamber, serving to precipitate gases and matter suspended therein, upon the molten metal from the smelter, as explained.

2. In a smelting furnace, the combination of a smelting and distributing chamber 1, a fire-box 22, a conduit 11 between them, a chimney 13 communicating with said conduit and a partition wall 1ª interposed between the smelting chamber and conduit having a tap-hole 9 at bottom and a range of apertures 8 for the passage of gases evolved from the melting matter, as herein described.

3. The combination of the smelting chamber 1, refining chamber 19, fire-box 22 delivering its heat into the refining chamber inclined conduit 11 from the smelter to the refining hearth, the separating pocket 14 in said conduit and tap-holes 15, 16 for removing the several materials from said pocket as explained.

4. The combination of a smelting and distributing chamber having suitable openings for charging and working the furnace, a conduit leading therefrom, a fire box communicating with the conduit and a partition wall between the smelting chamber and conduit, provided with a tap hole, and with a gas discharge flue, and one or more flues to be used alternately therewith, communicating with the conduit on a lower level, to effect the precipitation of metallic particles carried in suspension by the gases; substantially as explained.

5. The combination of the smelting and distributing chamber 1 having a perforated wall 1ª purifying chamber 19 connecting conduit 11 filtering wall 17, in the conduit between the distributing chamber 1 and purifying chamber 19 transverse flue 12 adjacent to the wall of distributing chamber and a stack 13 with which said flue connects, substantially as described.

6. A smelting furnace constructed with a smelting and distributing chamber capable of being completely closed in its upper part; a heating furnace, an inclined flue and conduit between the two, a wall between the smelting chamber and conduit pierced in its lower part with inclined ducts through which the evolved gases pass in a downward direction, causing the precipitation of volatile metallic particles, and a transverse flue adjacent to the partition wall, communicating with the conduit and conducting to the discharge stack, the gases of combustion from the furnace and the noxious gases from the smelting chamber.

7. The combination of the smelting and distributing chamber 1, the wall 1ª thereof having a tap hole at or near the bottom, the inclined ducts 9, 10, in the wall 1ª above the tap hole, the fire box 22, conduit 11 inclined downward from the tap hole of the smelting chamber toward the fire box, the transverse flue 12 connecting with the conduit 11 adjacent to the wall 1ª of the smelting chamber, and the discharge stack 13 with which said transverse flue 12 connects; substantially as and for the purposes set forth.

8. The combination of a smelting and distributing chamber, a fire-box, a conduit receiving molten metal from the smelter and through which heat is passed from the fire-box and a passage conducting gases from the smelter into the conduit, where they are subjected to the heat from the fire-box as explained.

9. The combination of a smelting and distributing chamber provided with a tap hole, a conduit for conducting molten metal therefrom, a fire box delivering heat into said conduit, and a gas passage through the wall of the smelting and distributing chamber above the level of the tap hole therein for conducting gases from the smelter to the conduit, where they are subjected to heat from the fire box, as set forth.

LOUIS ROBERT BONEHILL.

Witnesses:
GEORGE F. PIERROT,
L. C. GROSS.